United States Patent [19]

Schwartzman

[11] 4,178,761
[45] Dec. 18, 1979

[54] HEAT SOURCE AND HEAT SINK PUMPING SYSTEM AND METHOD

[76] Inventor: Everett H. Schwartzman, 724 Cloyden Rd., Palos Verdes Estates, Calif. 90274

[21] Appl. No.: 807,359

[22] Filed: Jun. 17, 1977

[51] Int. Cl.² .......................... F01K 25/10; F17C 7/02
[52] U.S. Cl. .......................................... 60/648; 60/671; 62/53
[58] Field of Search .......................... 60/648, 651, 671; 62/52, 53

[56] References Cited

U.S. PATENT DOCUMENTS

| 2,657,541 | 11/1953 | Schilling | 62/53 X |
| 2,964,917 | 12/1960 | Webster | 62/53 X |
| 3,154,928 | 11/1964 | Harmens | 62/53 |

Primary Examiner—Allen M. Ostrager
Attorney, Agent, or Firm—Smyth, Pavitt, Siegemund, Jones & Martella

[57] ABSTRACT

A pumping system deriving power from a heat source and heat sink, for producing either a liquid or gaseous output, utilizes the available thermal potential energy for conversion to work. A liquid, such as a cryogenic liquid is pumped to a first pressure and at least a portion of the output is pumped to a second and higher pressure. The liquid at the higher pressure flows through a heat exchanger to vaporize the liquid to a gas which drives a turbine for generating power to power the pumps or an electrical generator or both. The exhaust output of the turbine flows into the output of the first pump or stage. A recondensing heat exchanger may be used to recondense the turbine exhaust. The system may produce a liquid output or a gas output.

27 Claims, 8 Drawing Figures

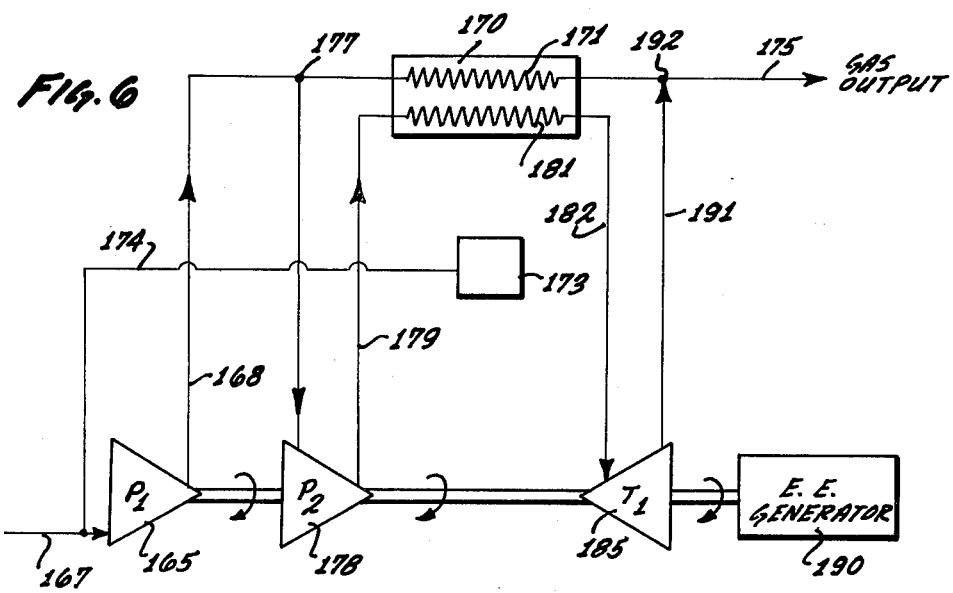

HEAT SOURCE AND HEAT SINK PUMPING SYSTEM AND METHOD

BACKGROUND OF THE INVENTION

It is well known that cryogenic liquids may be used as a heat sink in association with a heat source such that an engine between the heat source and heat sink may be used to convert the thermal potential energy into work. Typical cryogenic liquids are liquid air, liquid ammonia, liquid nitrogen, liquid hydrogen, liquid helium, liquid carbon dioxide, liquid oxygen, as well as liquid hydrocarbons such as methane, ethane, propane, butane, and liquid natural gas.

The temperature difference between the cold cryogenic liquid, which acts as a heat sink and a heat source, such as water, ambient air, sea water, waste heat, e.g. heated air or water, usually provides a sufficient spread in temperature such that thermal potential energy is available for conversion into useful work if a system is properly designed to take advantage of the thermal potential energy. Heretofore, this source of thermal potential energy has largely been overlooked because of the ready availability of other more conventional energy sources, i.e., electrical energy, hydrocarbon fuels and coal. Presently, however, there is a shortage of electrical energy as well as hydrocarbon fuels.

There are many instances in which cryogenic liquids are transported from one location to another, e.g. liquid hydrogen, nitrogen, oxygen, and the like, and pumped from a storage vessel to a transportation vessel (boat, truck or the like) to another storage vessel or to distribution network. For example, liquid natural gas (LNG) is normally transported by tanker ship, tank car, freight car or pipeline from one location to another, an operation which requires energy, usually electrical, to power the pumps. Heretofore, this has not presented any major problems since the LNG was domestically supplied and, if transported domestically, was usually in gaseous form by pipeline networks.

The shortage of natural gas has resulted in the importation of relatively large quantities of natural gas, usually transported by boat and in a liquid state to reduce the total cost of shipment. In this case, the freighter tankers are loaded and delivered to an on-shore or off-shore facility for distribution locally or through a pipeline network to other areas. The on-shore or off-shore receiving facilities or terminals normally include storage facilities in which the LNG, liquified and at relatively low pressures on the tanker, is stored in the facility of relatively low pressures and in a liquid state.

With the increasing demand for natural gas and the discussion of more on-shore and off-shore LNG facilities for receipt of LNG brought into major user areas, there has been increasing concern both from an ecological and safety standpoint as to the location and operation of such facilities. From a safety and ecology standpoint, the ideal location of an LNG terminal is off-shore or on-shore in a sparsely populated area in which the facility design is such that ecological impacts are not deemed unreasonably adverse.

The problem, however, is that off-shore terminals or sparsely populated areas, otherwise acceptible, may lack the available energy needed for facility function. For example, if LNG is to be shipped from the on-shore or off-shore terminal to other locations, it may be vaporized for pipeline transmission at substantial pressures. If shipped as a liquid, it must be pumped into tank cars or freight cars. On the other hand, if the LNG is to be introduced into a user distribution network from any storage facility, it is vaporized and the pressure is increased substantially, e.g., 1200 psi.

Where handled as a liquid, the pressure of the LNG may be increased from storage tank pressure of between ambient and 30 psi to 1200 psi. This is usually accomplished by electrically driven pumps which may include multistage pumps or gear boxes driven by the motor to achieve the pump speeds needed for generating the high pressure. Where the LNG is vaporized to a gas, the LNG is flowed through a vaporizer to produce an output at 1200 psi and at 50° F. by some application operation approximately 1½%, depending on the system, of the LNG through put is maybe burned to produce the heat for the vaporizer. Thus, for example, if a particular facility ships 8 million dollars a day of gaseous LNG, the costs for vaporization may be substantial if LNG is burned to provide heat for the vaporizers.

DESCRIPTION OF THE PRIOR ART

Systems are known for providing a liquid or gaseous output from a cryogenic supply, see for example U.S. Pat. No. 3,451,342 of June 24, 1969, and U.S. Pat. No. 3,570,261 of Mar. 16, 1971.

U.S. Pat. No. 3,451,342 describes several systems in which the output may be liquid or gas. In one form, a portion of the cryogenic liquid is fed to an auxiliary pump, driven by turbines with heat exchangers between the turbines, the turbines also driving a main pump through which a major portion of the cryogenic liquid is pumped. The exhaust from the last turbine is exhausted to atmosphere.

In another form, as described in U.S. Pat. No. 3,451,342, the output of the storage tank is flowed through a reciprocating pump, a portion of the output being vaporized to produce a high pressure power source for the pump, the pump exhaust being introduced back into the outlet downstream of a reducing pressure valve and upstream of a vaporizer. Other variants are described in which the exhaust of the power end of the pump is exhausted to atmosphere or in which the entire output is used to power the pump. While the above systems operate satisfactorily the systems which exhaust spent gas are wasting material while those which do not exhaust spent gas do not produce pressure and flow rate outputs which are sufficiently high to be useful in major facilities. Also, these systems do not take full advantage of the power generating potential of the liquid source material. In some instances, due to thermodynamic consideration, the heat exchangers are operated at high pressures, which presents no major problems for small heat exchangers. Where, however, there is a large mass flow and a high pressure output, e.g., 1200 psi, large heat exchangers operating above 1200 psi may be required and such heat exchangers present problems in operation and design.

U.S. Pat. No. 3,570,261 relates to a pumping system in which the entire output from the source passes through a heat exchanger into turbine used to drive a pump. The system output is gaseous and there are problems presented where the output is gaseous and at high mass flows at high pressures.

BRIEF DESCRIPTION OF THE INVENTION

By the present invention, which relates to an improvement system and method for pumping fluids and extracting useful work, many of the disadvantages of the prior art systems are overcome.

While the present system has special advantages in cryogenic pumping systems, it may also be used in those instances in which there is a heat sink and a heat source, for example, water and steam system in which the heat source is thermal solar energy. In describing this invention, however, reference is made to cryogenic liquids although other than cryogenic liquids may be used.

One of the advantages of the system and method of the present invention is that where there is a sufficient spread in temperatures between the heat source and heat sink, as for example with cryogenic liquids, power may be produced in the form of mechanical work or electrical energy. Where the invention is intended for use with large mass flow systems, e.g., LNG facilities, the advantage of the present system is that power may be generated while maintaining the heat exchangers within state of the art construction and operation parameters. Where the flow through heat exchanger is at a pressure above about 1200 psig, they are usually of special design. By this invention, output pressures of 1200 psig may be obtained while the pressure within the major heat exchangers does not exceed 1200 psig. Normally with the prior art systems, the pressures in the heat exchangers exceeds the system output pressure because of the need for a high pressure power source for turbine operation and the flow of substantially the entire system throughput through the turbines.

Thus, in accordance with this invention staged pumps are used, either a multistage pump or two pumps, one operating at a higher output pressure than the other, such that the liquid from the source is increased in pressure to a first level above that of the storage pressure. The liquid from the storage tank should have a thermodynamic condition of state such that it is subcooled or on the liquid-saturation curve of the pressure-enthalpy diagram for that material to avoid cavitation during pumping.

At least a portion of the output of the first pump or stage is fed to a second pump or stage and the pressure is again increased and the liquid is kept in the subcooled region of the pressure-enthalpy curve. The system output pressure is basically the output pressure of the second pump or stage, regardless of whether the output is gas or liquid.

Since one of the prime objects of the present invention is to provide a self-contained pumping system, i.e., one which generates its own power for pump operation, turbines are used as the devices to convert thermal potential energy into mechanical work which may also be converted into electrical energy. Thus, a source of gas is provided whose thermodynamic condition of state is in the super heated region of the pressure-enthalpy diagram and at a pressure above the output of the first pump or stage and in some cases above the pressure output of the second pump or stage. This pressurized gas is used to power a turbine whose design and speed are such as to provide the power for pump operation, either directly or by generating electrical energy or both.

Depending upon the particulars of the system, as described in detail below, the turbine exhaust may be flowed through a regenerative heat exchanger, but at a pressure greater than or equal to the output pressure of the first pump or stage but not in excess of the output pressure of the second pump or stage, i.e., not in excess of the system output pressure. During passage through the recondensing heat exchanger, the exhaust turbine gas is recondensed by the cooled liquid flowing through the heat exchanger thus altering the thermodynamic condition of state to bring it into the subcooled region of the pressure-enthalpy curve, where it can be admixed with the output of the first pump or stage or pumped up in pressure and fed into the output of the system.

In one form, the output of the second pump or stage flows through a vaporizer to vaporize the liquid to provide gas which powers a turbine driving a generator, the turbine exhaust being fed to the system output, the generated electrical energy being used to power the pump and other uses as may be appropriate.

In other forms, the turbines provide pump power by direct coupling to the pumps and generation of electrical energy in addition.

The system output may be liquid or gas depending upon the particular form. Regardless of the form, there is no air pollution since the material burned is natural gas and there is no chemical or water pollution since any water used is for heat exchanger purposes and the water is cooled in the process, i.e. the water is not heated during the heat exchange. By the system of this invention adverse ecological impacts are substantially reduced or eliminated and power, either mechanical or electrical or both are produced from the cryogenic material.

Where materials other than cryogenic materials are used, the heat source may be solar energy, waste heat and the like.

Further details and description of the novel features of this invention, as well as various forms of the system, will become apparent from the following detailed description taken with the accompanying drawings which are representative of the practice of the present invention.

DESCRIPTION OF THE DRAWINGS

FIG. 6 is another form of the present invention in which a gaseous output is produced and in which electrical energy is produced; and FIG. 7 is still another form of the present invention for producing a liquid output while generating electrical energy.

DETAILED DESCRIPTION OF THE INVENTION

Figure 1:
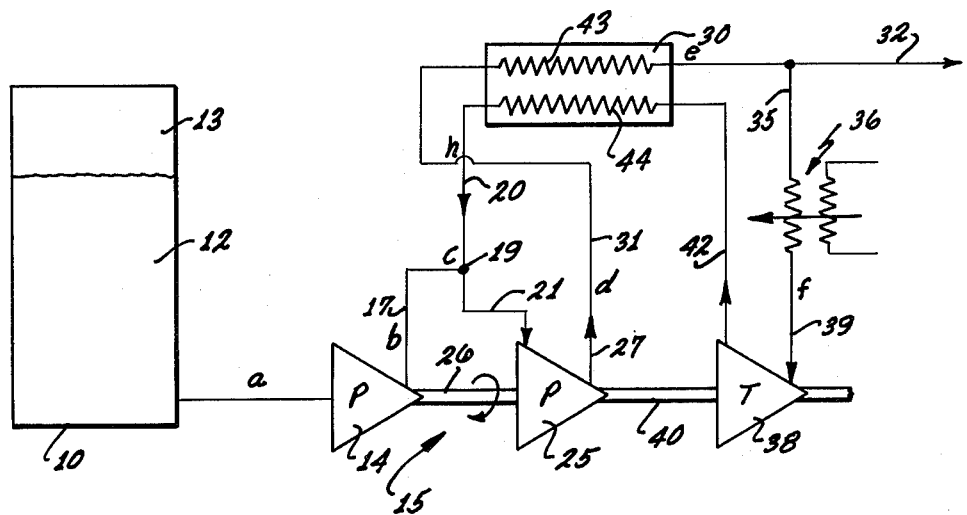
FIG. 1 is a schematic diagram illustrating a system of the present invention in which a liquid output is produced.

Referring to FIG. 1, which illustrates one embodiment of the liquid pumping system of the present invention, liquid 10 in a source such as storage vessel 12 with a vapor section 13 is transferred to the first stage 14 of a pump generally indicated 15. The source may be any cryogenic material such as LNG in a vehicle mounted tank, pipeline, ground based storage tank, or LNG vessel or off-shore storage unit. In some forms of the invention, the cryogenic material may be liquid air, nitrogen, hydrogen, helium or hydrocarbon materials.

The first stage 14 of pump 15 pressurizes the cryogenic liquid, the output 17 of the first stage being flowed to a junction 19 with conduit 20 which forms a common conduit 21 which is the input to a second stage 25 of pump 15, the stages 14 and 25 being on a common shaft 26, as shown. The output 27 of the second stage 25, at the desired system output pressure, is flowed to a recondenser unit 30 via conduit 31 and exits the recondenser 30 through line 32 as a liquid at the proper desired system pressure.

A portion of the output in line 32 is flowed through conduit 35 to a heater-vaporizer 36 where the liquid is heated to a vapor and flowed into turbine 38 through turbine inlet line 39, the vaporizer forming a supply of vapor for the turbine. As the vapor flows through the turbine, it gives up useable energy which is converted into mechanical work by the turbine 38 whose shaft 40 is connected to the second stage 25, the shaft 26 being common with shaft 40 such that both stages 14 and 25 of the pump 15 are driven by the turbine.

The exhaust from the turbine 38 flows through line 42 into pass 44 the recondenser 30 where the gaseous turbine exhaust is reliquified by the pressurized liquid flowing in pass 43 of the recondenser. Recondensed turbine vapor flows from pass 44 into line 20 to line 21 to the second stage 25 of the pump.

The pressure of vessel 12 is less than the output 17 of the first pump stage 14 which is less than the second stage 25. Thus, the first stage of the pump forms a source of pressure intermediate between the source of the cryogenic material and the delivery end 32 of the system. By the use of a stage or plurality of stages having a pressure intermediate from the source pressure and the system output pressure, it is possible to use a recondensing heat exchanger and turbine to form a power system for the pump stages, all in a closed loop bypass system which enables use of a portion of the output which is vaporized to drive a turbine for pump power and which material is then recondensed and pumped to system output pressure. By way of example, tank 12 may be LNG at 30 psig, this first stage output being 150 psig, the second stage output being 1200 psig. Line 35 takes about 15% of the output and heats it to about 1200 psi at 50°-60° F. for infeed into the turbine.

Figure 2:
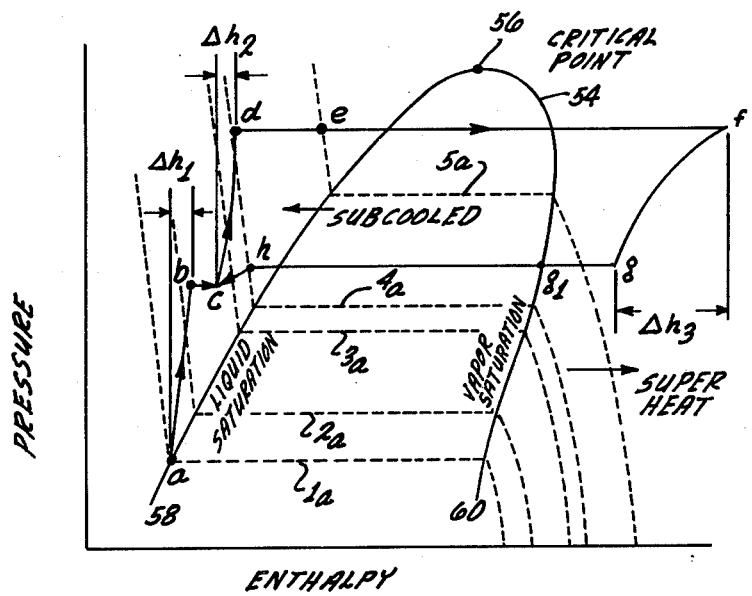
FIG. 2 is a pressure-enthalpy diagram representing the thermodynamic events of the system of FIG. 1.

Referring to FIG. 2, there is shown a representative pressure-enthalpy diagram for a specific material in which pressure is the ordinate and enthalpy the abscissa and in which constant temperature curves are superimposed in dotted lines. The region under the "dome" 54 represents quantities of the substance in the mixed liquid-gaseous phase equilibrium with the usual critical point indicated at 56. The portion of the curve from point 58 to 56 represents the equilibrium line for a saturated liquid, i.e., the "saturated liquid line." To the left of the saturated liquid line is the subcooled region in which the material is colder than its boiling point. The portion of the curve from 60 to 56 represents the equilibrium line for a saturated gas with the superheat region being to the right of the saturated gas equilibrium line. The material in the superheat region is at a temperature above the boiling point.

The constant temperature curves shown are for purposes of illustration and are identified as 1a, 2a, 3a, 4a, and 5a, with the temperature increasing from 1a to 5a.

Referring now to FIGS. 1 and 2, the locus from point a to point b in FIG. 2 represents the thermodynamic process of pump stage 14 with the required work input being designated as $\Delta h_1$. As seen from this curve, liquid from a source is liquid saturated and in the subcooled region. The pressure of the liquid is increased above the supply pressure with a slight increase in temperature from 1a to 2a such that the liquid leaving the first stage of the pump is still in the subcooled region. It is important to maintain the thermodynamic condition of state of the fluid at the inlet of the first stage of the pump in the subcooled region to prevent cavitation of the pump.

The locus from b to c represents the thermodynamic process of the mixing of the stream of fluid from conduit 17, i.e., the output of pump stage 14, with the stream of the reliquified turbine exhaust in conduit 20 at junction 19. There is no appreciable change in pressure and the admixed liquids are each in the subcooled region although the liquid from the reliquified turbine exhaust is warmer than from the first stage 14 of the pump 15. Point c represents the final state of the mixed streams which are in a subcooled condition since point c is to the left of the saturation curve.

The locus from point c to point d represents the thermodynamic process of the second stage 25 of the pump with the required work input designated $\Delta h_2$. Here again, the liquid is in the subcooled region prior to entering the second stage of the pump, again to prevent cavitation in the pump. As indicated, the liquid is heated slightly, as indicated by curve 4a, but again is well in the subcooled region, and its pressure is increased substantially over supply source pressure and above the pressure output of the first stage of the pump.

The locus from point d to e represents the thermodynamic process in which the output of the second stage of the pump 15 is warmed from a temperature corresponding to temperature curve 4a to that of curve 5a, point e being well within the subcooled region and the increase in temperature occurring without substantial increase in pressure. The heating of the liquid output of the second pump stage takes place in pass 43 of the heat exchanger 30 by warming up in the exchange with vapor flowing in pass 44 which is cooled. The thermodynamic state of the subcooled liquid at point e is the subcooled liquid condition at which the high pressure fluid exits the system through conduit 32.

The locus from point e to f represents the thermodynamic process in which a portion of the high pressure liquid output is vaporized in heater 36 as indicated by the transition of the fluid from the subcooled liquid saturation state to the super heated vapor saturated state, point f being in the superheated region.

The locus from point f to point g represents the thermodynamic process which the limited portion flowing in turbine inlet line 39 undergoes as it is expanded through the turbine 38, giving up energy which is converted to mechanical work as represented by $\Delta h_3$. As will be noted, $\Delta h_3$ is equal to or slightly greater than the sum of the work required by the first stage 14 ($\Delta h_1$) and the second stage 25 ($\Delta h_2$). In the expansion, the gas is cooled and the pressure reduced in the transition from point f to g. The turbine 38 thus drives both the first and second stage of the pump 15.

The locus from point g to $g_1$ to h represents the thermodynamic process in which the vapor exhaust 38 is recondensed to a liquid in pass 44 of the heat exchanger 30 prior to being mixed at junction 19, as is apparent by the transition from the superheated region across the vapor saturation curve and the liquid saturation curve into the subcooled region. This is accomplished by the fluid in pass 43 which is the output of the pump 15 and may be understood more readily with reference to FIG. 2a along with FIG. 2.

Figure 2A:
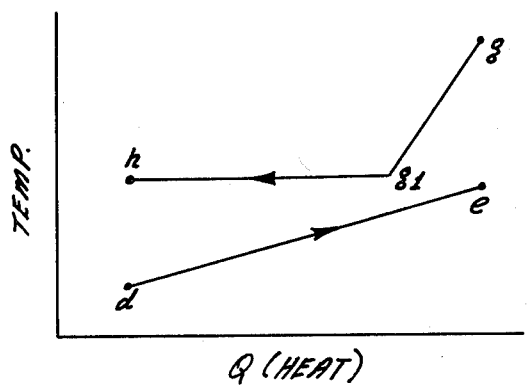
FIG. 2a is a temperature-heat diagram representing the conditions of the heat exchanger of FIG. 1.

FIG. 2a shows the relation between Q (BTU total) versus temperature, representing heat exchanger operation. The curve g, $g_1$, h is above curve d, e and there is sufficient spread to avoid "pinch off" in the heat exchanger. The locus g to $g_1$ shows a reduction in temperature to point $g_1$ and a constant temperature to h. The Q decreases from g to $g_1$ with a reduction in temperature while the reduction in Q from $g_1$ to h is at a relatively constant temperature. The region from $g_1$ to h represents recondensation of the turbine exhaust. From FIG. 2 it become apparent that the transition from g through $g_1$ to h is essentially at constant pressure. At the same time the Q of the output of the pump is increased while the temperature is also increased. Thus FIG. 2a shows the amount of heat exchanged and the relative temperatures.

If point h (FIG. 2) falls into the subcooled region, it is possible to pump the recondensed liquid directly into the system outlet, provided the pumping action does not bring the thermodynamic condition of state of the material on the saturation curve or under the dome.

By the present invention, this problem is eliminated since even if h falls under the dome or on the saturation curve, by admixing the recondensed output of the turbine with the output of the first stage, thus asserting that the material is in the subcooled region and is capable of being pumped without cavitation.

Figure 3:
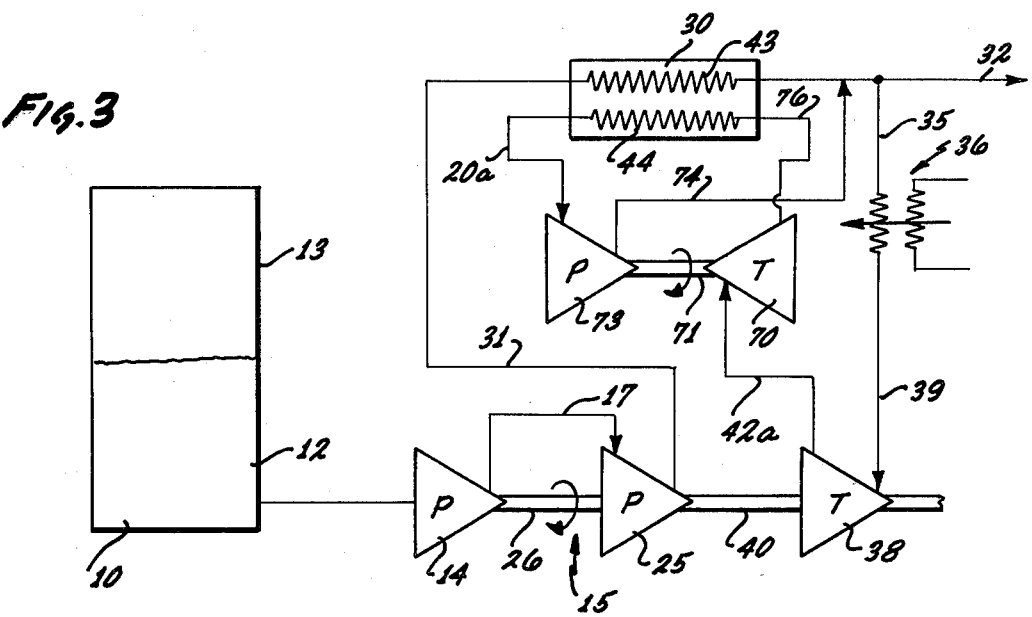
FIG. 3 is a modified form of the system of FIG. 1 of this invention in which the turbine exhaust is pressurized and returned to the output.

If however, point h falls far enough into the subcooled region due to the nature of the heat transfer conditions of the recondenser unit, the system shown in FIG. 3 may be used, where like reference numerals have been used for the parts already described. In this system the output 42a of turbine 38 drives a second turbine 70 connected by shaft 71 to a pump 73. The input to pump 73 is the material flowing in pass 44 of the recondenser 30 which enters the pump 73 through line 20a. The output 74 of pump 73 is flowed into the system output upstream of the tap 35 for the heater 36, while the exhaust 76 of turbine 70 flows into pass 44 of the recondenser. The system output at 32 is a liquid as in the system of FIG. 1.

In effect, referring to FIG. 2, the system of FIG. 3 eliminates leg e to h and interconnects point h to point e in the subcooled region left of the liquid saturation curve 58. Also, if leg f to g represents the thermodynamic process of the diverted portion 39 flowing in turbines 38 and 70, point g will be at a somewhat lower pressure than shown in FIG. 2 for the system of FIG. 3.

It is to be understood that although the systems of FIGS. 1 and 3 provide a liquid output at elevated pressure above supply inlet pressure, it is possible to place a vaporizer in the outlet line, downstream of tap 35 to vaporize the fluid to a vapor.

Figure 4:
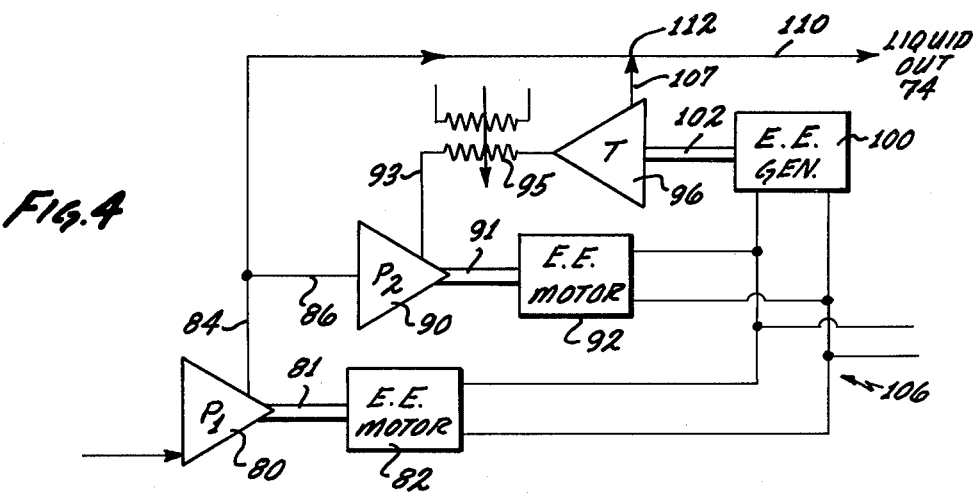
FIG. 4 is another modification of the system of the present invention in which electrical energy is generated.

Referring now to FIG. 4, a form of the invention is shown in which a portion of the material being pumped is used as an energy source to produce electricity in a system having a liquid output. Liquid in a subcooled or on the liquid saturation curve is introduced into pump 80 which may be a single or multiple stage pump driven through shaft 81 by electrical motor 82. The output 84 of the pump 80 is a liquid, a portion 86 of which is transferred to pump 90 driven by shaft 91 from electrical motor 92.

The high pressure fluid output 93 of pump 90 is vaporized in heat exchanger 95 and then expanded in a turbine 96 which may be a single or multiple stage turbine which drives an electrical generator 100 through shaft 102. The electrical energy 106 from generator 100 is in turn used to drive electrical pump motors 82 and 92.

The exhaust from turbine 96 is fed through line 107 back to the main liquid output line 110 at point 112. Since the main output from pump 80 is in a highly subcooled state and since a relatively small amount of vaporized fluid is needed to produce enough power to drive pump 80 and 90, upon mixing the two streams at point 112 the fluid output in line 110 will in in a liquid state but not as subcooled as that leaving the pump 80 which is flowed in line 84 to the mixing point 112.

Figure 5:
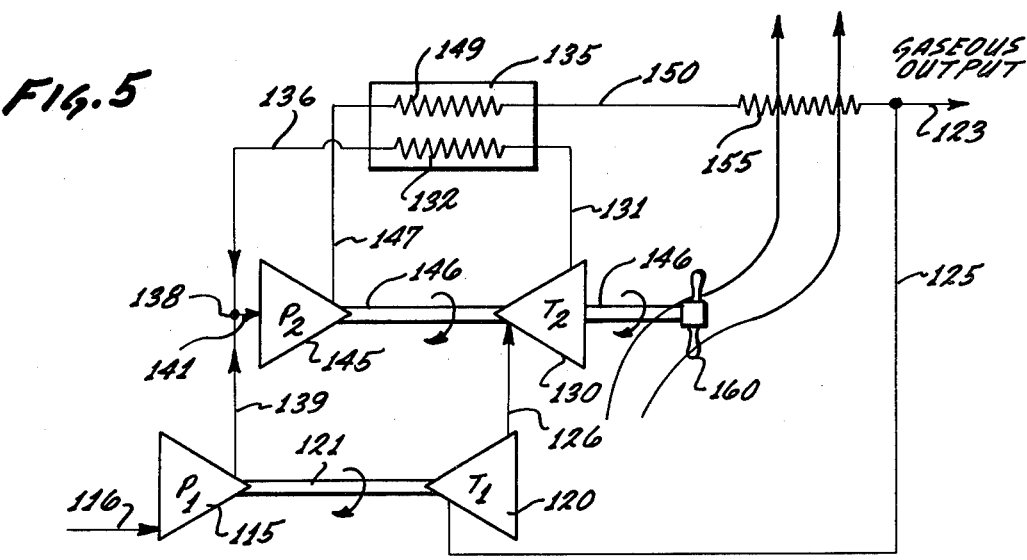
FIG. 5 is another form of the present invention, similar to FIG. 1, but showing a system for generating a gaseous output.

The system of FIG. 5, which is another variant of the present invention, is designed specifically to provide a gaseous output at desired pressure substantially above source pressure. Liquid from the source is introduced into pump 115 through line 116 and is pumped to an intermediate pressure lower than the output pressure. Power for pump 115 comes from turbine 120 through shaft 121, the turbine receiving a portion of the vapor output at elevated system output pressure in line 123 through a bypass line 125. The exhaust of turbine 120 is flowed through line 126 to power a second turbine 130.

The exhaust of turbine 130 flows through line 131 into pass 132 of heat exchanger 135 and exits as recondensed liquid turbine exhaust through line 136 to junction 138. The output of pump 115 flows in line 139 to junction 138 where it is admixed with recondensed liquid leaving pass 132 of heat exchanger 135. The mixed liquid stream flows through line 141 to pump 145 powered by turbine 130 through shaft 146.

The output of pump 145, at the desired output pressure, is transferred through line 147 into pass 149 of the heat exchanger 135 to recondense the material flowing in pass 132 and coming from the turbine 130, that material being the turbine exhaust gas. The liquid in pass 149, somewhat warmed by the material in pass 132 (which is recondensed in the process) then flows through conduit 150 to a main vaporizer 155 where it is completely vaporized by an external heat source.

The external heat source may be in the form of heat transfer media such as sea water, or other fluid or gas or may be supplied by a heat producing reaction in a burner. A portion of the gas from the vaporizer flows through a line 125 to turbine 120 where it is expanded to produce power to drive pump 115. The exhaust from turbine 120 then flows through pipe 126 to turbine 130 where it is further expanded to a pressure level somewhat higher than the intermediate pressure output of pump 115 in line 139. Upon expansion through turbine 130 enough energy is extracted so that the turbine 130 can power pump 145 and an auxiliary pump 160 connected to the shaft 146 of turbine 130.

The auxiliary pump 160 may be used to pump the external heat transfer media such as sea water or may be a blower to force air through vaporizer 155 to vaporize the pressurized fluid. The all gaseous fluid output exits the system through line 123 at the desired pressure. As earlier mentioned, the pumps and turbines may be single or multiple stage units.

The system of FIG. 6 is another form of this invention in which a gaseous output is provided and wherein electrical energy is generated. Main pump 165 receives liquid from a source through line 167, increases the pressure and discharges into line 168. The high pressure output in line 168 flows to heat exchanger 170 where it is vaporized during flow through pass 171 by heat transfer from heat produced by a combustor 173, the latter powered from fuel in line 174 connected to the source or the inlet line 167. After vaporization of the fluid in pass 171, the gas exits the system through outlet line 175.

A portion of the fluid in line 168 is diverted at junction 177 to be fed to the higher pressure staged pump 178 where it is pressurized to a pressure higher than the required output pressure and discharged from pump 178 into line 179. From line 179 the high pressure liquid is flowed through pass 181 of heat exchanger 170 where the high pressure liquid is vaporized by heat transfer relationship from the heat produced by combustor 173 supplied to the heat exchanger 170.

The outlet 182 of pass 181 is high pressure vaporized fluid which is then flowed to turbine 185 where work is extracted during the expansion through the turbine. The work extracted is used to power pumps 178 and 165 and electrical generator 190. The fluid which exhausts from the turbine 185 is at a slightly higher pressure than the required output at 175 and is directed through line 191 to point 192 where it is fed into the main output line 175 to be mixed with gaseous fluid exiting from pass 171 of the heat exchanger 170. The electricity from generator 190 may be used in various ways.

In FIG. 7 still another form of the present invention is shown in which the desired high pressure liquid output is produced by a recondensing system in conjunction with a high pressure electrical power producing system. The cryogenic fluid entering the pump 200, which includes stages 201 and 202, through inlet line 203 is pressurized to an intermediate pressure and flows through line 206 to point 207 where it is mixed with the recondensed turbine exhaust flowing in line 208.

The output of pump 202 is at a pressure which is essentially the output pressure of the liquid flowing in outlet line 210. From pump 202, the liquid enters a recondensing heat exchanger 212 through line 214 into pass 216 to recondense the turbine exhaust entering pass 217 from line 219 by a direct heat exchange process, the recondensed turbine exhaust then flowing through line 208 to junction 207.

A portion of the high pressure liquid output is tapped off at point 220 and used in pump 225 where the pressure is increased further, the output of the pump being flowed through a heat exchanger 227 where the liquid is vaporized and used in turbine 230 to power pump 225 and to generate electricity by generator 231 associated with the turbine 230. The exhaust from turbine 230 flows in line 219 to the recondensing heat exchanger 212 as described.

The turbine 230 and generator 231 produces enough power to drive motor 233 which drives pumps 201 and 202, the excess electrical power being available for use elsewhere as indicated by the electrical power output 235.

The heat energy for the vaporizing heat exchanger 227 may be supplied from the environment through a heat transfer media such as fresh water, sea water or ambient air; or can be supplied by any available waste heat or by a burner to produce the required amount of heat to vaporize the fluid pressurized by pump 225.

The system of FIG. 7 is of particular use where the desired system output pressure of the liquid is relatively low, for example in cryogenic fluid transfer operations. In this form, motor 233 may optionally be driven from any electrical source such as conventional utility power.

The various systems above described offer the advantage of generating power or work or both from fluids in which the fluid is a heat sink and there is an available heat source. This is accomplished by use of a regenerative heat exchanger, in some forms, and by pressurizing the liquid to two different pressures to drive a turbine. It will be apparent, however, that those skilled in the art may use various other forms and modifications, coming within the hereinafter recited claims.

What is claimed is:

1. A pumping system for a liquid in which the output of the system is at a higher pressure than the pressure of the liquid in a storage source comprising:

pump means including a first and second section wherein the pressure of the second section is higher than the first, means to flow at least a portion of the output of said first section of said pump into the second section of said pump, heat exchanger means, means interconnecting the output of the second section of said pump means to said heat exchanger, means forming an outlet for said pumping system, turbine means for generating power to operate said pump means and including a turbine exhaust, means forming a supply of said liquid in vapor form whose thermodynamic condition of state is that of vapor saturation or in the superheat region based on the pressure enthalpy curve for said material, means interconnecting said supply of vaporized liquid for flow through said turbine means, and means interconnecting said heat exchanger such that at least a portion of the output thereof flows through the outlet of said pumping system.

2. A pumping system as set forth in claim 1 wherein said heat exchanger means is a regenerative heat exchanger receiving the liquid at said higher pressure from said second section of said pump means, and means for flowing the exhaust from the turbine to the output being so connected that said exhaust flows through said regenerative heat exchanger and is recondensed therein.

3. A pumping system as set forth in claim 2 wherein said turbine means includes a first and second turbine each of which includes an exhaust, means connecting the supply of vaporized liquid to said first turbine, means connecting the exhaust of the first turbine to the input of the second turbine, said means for flowing being so interconnected that the exhaust of said second turbine flows through said heat exchanger, and said system producing a gaseous output.

4. A pumping system as set forth in claim 2 wherein said system output is liquid, said supply of vaporized liquid including a vaporizer and means to flow a portion of the system output through said vaporizer, and means to connect said vaporizer to said turbine.

5. A pumping system as set forth in claim 1 wherein said system output is liquid,
said supply of vaporized liquid including a vaporizer and means to flow a portion of the system output through said vaporizer,
said turbine means including a first and second turbine,
means connecting the output of the vaporizer to the input of the first turbine,
means connecting the exhaust first turbine to the input of the second turbine,
means connecting the exhaust of the second turbine to said heat exchanger to recondense said exhaust, and
means to flow said recondensed exhaust into said pump means.

6. A pumping system as set forth in claim 1 wherein the output is a gas.

7. A pumping system as set forth in claim 1 wherein said heat exchanger is a regenerative heat exchanger for recondensing said turbine exhaust.

8. A pumping system as set forth in claim 1 wherein said heat exchanger is a vaporizer,
means connecting the output of said vaporizer to said turbine,
means connecting the input of said vaporizer to the second section of said pump, and
means connecting the exhaust of said turbine to the system output.

9. A pumping system as set forth in claim 8 wherein an electrical generator is connected to be driven by said turbine to provide electrical power a portion of which drives said pump means.

10. A pumping system as set forth in claim 1 wherein said turbine includes an electrical generator driven by said turbine.

11. A pumping system as set forth in claim 10 wherein said pump means is driven by electrical energy produced by said generator.

12. A pumping system as set forth in claim 10 wherein said turbine drives pump means and said generator.

13. A pumping system as set forth in claim 7 wherein heat energy is applied to said heat exchanger to vaporize the liquid entering said heat exchanger,
said turbine being connected to drive said pump means, and
said system producing a gaseous output.

14. A pumping system as set forth in claim 7 further including additional pump means,
vaporizer means interconnected between said additional pump means and said turbine means for vaporizing the output of the additional pump to power said turbine means,
electrical generator means driven by said turbine, and said pump means being driven by an electrical motor.

15. A pumping system as set forth in claim 1 wherein said liquid is a cryogenic liquid.

16. A method for pumping a liquid in which the output is at a pressure higher than the pressure of the liquid from the source comprising:
pumping said liquid to a first pressure,
pumping a portion of the liquid at said first pressure to a second pressure higher than said first,
vaporizing at least a portion of the liquid at said second pressure to form a supply of a vaporized liquid,
flowing said vaporized liquid through a turbine for producing power for at least said pumping operation and producing a turbine exhaust, and
flowing said turbine exhaust into the output of one of said liquids at said first and second pressures.

17. A method as set forth in claim 16 wherein said liquid is a cryogenic liquid.

18. A method as set forth in claim 17 wherein said cryogenic liquid is liquid natural gas.

19. A method as set forth in claim 17 wherein the output is a gas.

20. A method as set forth in claim 17 wherein the output is a liquid.

21. A method as set forth in claim 19 in which the output of the turbine is flowed through a recondensing heat exchanger, and
flowing the liquid at said higher pressure through said heat exchanger to recondense the vapor output from the turbine.

22. A method as set forth in claim 21 wherein heat is applied to said heat exchanger to vaporize the liquid flowing therethrough.

23. A method as set forth in claim 20 wherein a portion of the output is flowed through a pump,
flowing the output of said pump through a vaporizer to provide gas to power a turbine,
flowing said vaporized gas through a turbine to power said pump, and
flowing the turbine exhaust into a heat exchanger to recondense said turbine exhaust.

24. A method as set forth in claim 16 in which flow of said vaporized liquid through said turbine produces electrical energy.

25. A pumping system for a liquid in which the output of the system is at a higher pressure than the pressure of the liquid in a storage source comprising:
pump means connected to said source for receiving the liquid whose thermodynamic condition of state is that of liquid saturation or in the subcooled region based on the pressure-enthalpy curve for the material in said source,
means forming an outlet for said pumping system,
heat exchanger means receiving the liquid from said pump means,
means forming a supply of vaporized liquid whose thermodynamic condition of state is in the saturated or superheated region of the pressure-enthalpy curve for the material,
turbine means receiving said vaporized liquid for producing power for the operation of said pump means and providing a turbine exhaust in gaseous form but at a pressure at or below said system output pressure,
means to flow said turbine exhaust through said heat exchanger for recondensation of said exhaust into liquid form such that the thermodynamic condition of state of said recondensed exhaust is that of liquid saturation or in the subcooled region based on the pressure-enthalpy curve for said material, and
means for admixing said recondensed vapor with liquid material whose thermodynamic condition of state is that of liquid saturation or in the subcooled region based on the pressure-enthalpy curve for said material.

26. A pumping system as set forth in claim 25 wherein said liquid is a cryogenic liquid.

27. A pumping system as set forth in claim 26 wherein said cryogenic liquid is liquid natural gas.

* * * * *